United States Patent [19]
Qi

[11] Patent Number: 6,056,782
[45] Date of Patent: May 2, 2000

[54] SYNCHRONOUS MACHINE SIMULATOR AND SYNCHRONOUS MACHINE SIMULATION METHOD

[75] Inventor: Jian Ping Qi, Tokyo, Japan

[73] Assignee: Mitsubishi Denki Kabushiki Kaisha, Tokyo, Japan

[21] Appl. No.: 09/080,311

[22] Filed: May 18, 1998

[30] Foreign Application Priority Data

Dec. 10, 1997 [JP] Japan .................................... 9-340386

[51] Int. Cl.[7] .................................................. G05B 17/00
[52] U.S. Cl. ................................... 703/18; 703/13; 703/2
[58] Field of Search .......................... 395/500.23, 500.34, 395/500.39, 500.38

[56] References Cited

PUBLICATIONS

Yamamura, S., "Spiral vector theory of salient–pole synchronous machine," Conf. Record of the 1992 IEEE Industry Applications Society Annual Meeting, vol. 1, Oct. 1992, pp. 204–211.

Yamamura, S., "Spiral vector theory of synchronous machine," IEEE Int. Electric Machines and Drives Conf. Record, May 1997, pp. wb1–7.1—wb1–73.

Sakae Yamamura, "Spiral Vector Theory of AC Circuits and Machines", Monographs in Electrical and Electronic Engineering–26, Oxford Science Publications, 1992.

*Primary Examiner*—Kevin J. Teska
*Assistant Examiner*—Kyle J. Choi
*Attorney, Agent, or Firm*—Leydig, Voit & Mayer

[57] ABSTRACT

A synchronous machine simulator and a method of simulation convert real three-phase instantaneous voltage values into spiral vectors and calculate a positive-sequence component current based on the conversion results, to obtain real instantaneous values of a three phase current flowing in the synchronous machine.

18 Claims, 9 Drawing Sheets

SYNCHRONOUS MACHINE SIMULATOR AND SYNCHRONOUS MACHINE SIMULATION METHOD

BACKGROUND OF THE INVENTION

1. Field of the Invention

The present invention relates to a synchronous machine simulator and a synchronous machine simulation method for simulating a synchronous machine in an electrical power system.

2. Description of the Prior Art

FIG. 18 is a block diagram showing a conventional synchronous machine simulator. In FIG. 18, the reference number 1 designates an analogue to digital (A/D) conversion section for converting real instantaneous values of both a three phase analogue voltage and three phase analogue current into digital values thereof, and the reference number 2 denotes a d-q axis conversion section for converting the three phase voltage and the three phase current in digital form, that are converted in the A/D conversion operation executed by the A/D conversion section 1, into a direct voltage and a direct current and for outputting the direct voltage and the direct current. The reference number 3 indicates an exciting system calculation section for calculating an exciting voltage and an exciting current of the synchronous machine based on the three phase voltage and the three phase current that have been converted by the A/D conversion section 1. The reference number 4 designates a magnetic flux calculating section for calculating a variation part of the magnetic flux of the synchronous machine based on the direct voltage and the direct current outputted from the d-q axis conversion section 2 and the exciting voltage and the exciting current outputted from the exciting system calculation section 3. The reference number 5 denotes a shaft system calculation section for calculating a variation part of a shaft torque of the synchronous machine by using the variation part of the magnetic flux outputted from the magnetic flux calculation section 4 and the variation part of the shaft torque of a speed governor. The reference number 6 denotes a speed governor calculation section for calculating a variation part of the speed governor based on the variation part of the shaft torque. The reference number 7 designates an instruction value calculation section for calculating instruction values based on the variation part of the magnetic flux outputted from the magnetic flux calculation section 4 and the variation part of the shaft torque outputted from the shaft system calculation section 5. The reference number 8 indicates a sine wave generation section for generating a three phase sine wave voltage according to the instruction values outputted from the instruction value calculation section 7. The reference number 9 designates an amplifier and 10 indicates an electrical reactor.

Next, a description will be given of the operation of the conventional synchronous machine simulator shown in FIG. 18.

First, for the simulation of the synchronous machine, the A/D conversion section 1 performs the A/D conversion. During the A/D conversion, the real instantaneous values of analogue of both a three phase analogue voltage and a three phase analogue current of analogue are converted into the digital values thereof.

When the A/D conversion section 1 converts the three phase voltage and the three phase current into the digital values thereof, the exciting system calculation section 3 calculates the exciting voltage and an exciting current of the synchronous machine based on the three phase voltage and the three phase current in digital form. In addition, when the A/D conversion section 1 converts the three phase voltage and the three phase current into the digital values thereof, the d-q axis conversion section 2 performs the d-q axis conversion operation for the three phase voltage and the three phase current in digital form and generates and outputs the direct voltage and the direct current.

When the d-q axis conversion section 2 outputs the direct voltage and the direct current and when the exciting system calculation section 3 outputs the exciting voltage and the exciting current, the magnetic flux calculation section 4 calculates a variation part of the magnetic flux of the synchronous machine by using the direct voltage, the direct current, the exciting voltage, and the exciting current.

Furthermore, when the magnetic flux calculation section 4 outputs the variation part of the magnetic flux of the synchronous machine, the shaft system calculation section 5 calculates a variation part of the shaft vector of the synchronous machine based on the variation part of the speed governor system that has been calculated by the variation part of the magnetic flux and the speed governor calculation section 6.

After the magnetic flux calculation section 4 outputs the variation part of the magnetic flux of the synchronous machine and after the shaft system calculation section 5 outputs the variation part of the shaft torque, the instruction value calculation section 7 calculates instruction values based on the variation part of the magnetic flux and the variation part of the shaft torque and then outputs the instruction values to the three phase sine wave generation section 8. Thereby, the three phase sine wave generation section 8 generates a three phase sine wave voltage according to the instruction values in order to perform the simulation of the synchronous machine.

Thus, the conventional synchronous machine simulator has the configuration described above. Because the instruction values are generated based on the variation part (as a variation part of the electrical system) of the magnetic flux of the synchronous machine and the variation part (as a variation part of a mechanical system) of the shaft torque of the synchronous machine and because those instruction values are calculated based on the direct voltage and the direct current that are converted by the d-q axis conversion operation, there is a drawback that it is difficult to simulate the transient state of the AC electrical system accurately. For example, there is the conventional drawback in which it is difficult to generate double-frequency transient AC currents and transient DC currents, that may be generated originally, in symmetrical faults happened near the terminals of the synchronous machine, and it is also difficult to generate triple-frequency transient AC currents and the like, that may also be generated originally, in unsymmetrical faults happened near the terminals of the synchronous machine.

SUMMARY OF THE INVENTION

Accordingly, an object of the present invention is, with due consideration to the drawbacks of the conventional synchronous machine simulator, to provide a synchronous machine simulator and a synchronous machine simulation method that are capable of simulating a transient phenomena of an electrical system in a synchronous machine accurately.

In accordance with a preferred embodiment of the present invention, a synchronous machine simulator comprises spiral conversion means for converting real instantaneous values of a three phase voltage expressing a terminal voltage of a synchronous machine to be a target for simulation into spiral vectors of complex number, voltage calculation means for performing a symmetrical component conversion for said spiral vectors of complex number in order to calculate a positive-sequence component voltage, a negative-sequence component voltage, and a zero-sequence component voltage, and for calculating an internal voltage of said synchronous machine by using said positive-sequence component voltage and a phase angle of said synchronous machine, and current calculation means for calculating a positive-sequence component current, a negative-sequence component current, and a zero-sequence component current by using said positive-sequence component voltage, said negative-sequence component voltage, and said zero-sequence component voltage calculated by said voltage calculation means. In the synchronous machine simulator, said synchronous machine simulator calculates simulation values of said synchronous machine by using said calculation results obtained by said spiral conversion means, said voltage calculation means, and said current calculation means.

The synchronous machine simulator as another preferred embodiment of the present invention further comprises spiral inverse conversion means for calculating real instantaneous values of a three phase current in said synchronous machine by performing a symmetrical component conversion for said positive-sequence component current, said negative-sequence component current, and said zero-sequence component current calculated by said current calculation means.

The synchronous machine simulator as another preferred embodiment of the present invention further comprises electrical power calculation means for calculating an active electric power and a reactive electrical power of said synchronous machine based on said positive-sequence component voltage, said negative-sequence component voltage, said zero-sequence component voltage, said positive-sequence component current, said negative-sequence component current, and said zero-sequence component current as said calculation results calculated by said voltage calculation means and said current calculation means.

The synchronous machine simulator as another preferred embodiment of the present invention further comprises electrical system torque calculation means for calculating an electrical system torque of said synchronous machine based on said calculation results such as said positive-sequence component voltage, said negative-sequence component voltage, said zero-sequence component voltage, said positive-sequence component current, said negative-sequence component current, and said zero-sequence component current calculated by said voltage calculation means and said current calculation means.

The synchronous machine simulator as another preferred embodiment of the present invention further comprises electrical power calculation means for calculating an active electric power and a reactive electrical power of said synchronous machine based on said calculation results of said voltage calculation means and said current calculation means, and electrical system torque calculation means for calculating an electrical system torque of said synchronous machine based on said calculation results of said voltage calculation means and said current calculation means.

The synchronous machine simulator as another preferred embodiment of the present invention further comprises spiral inverse conversion means for calculating real instantaneous values of a three phase current in said synchronous machine by performing a symmetrical component conversion for said positive-sequence component current, said negative-sequence component current, and said zero-sequence component current calculated by said current calculation means, electrical power calculation means for calculating an active electric power and a reactive electrical power of said synchronous machine based on said calculation results of said voltage calculation means and said current calculation means, and electrical system torque means for calculating an electrical system torque of said synchronous machine based on said calculation results of said voltage calculation means and said current calculation means.

The synchronous machine simulator as another preferred embodiment of the present invention further comprises mechanical system torque calculation means for calculating a mechanical system torque of said synchronous machine by using said electrical system torque calculated by said electrical system torque calculation means and a frequency of said electrical power system.

The synchronous machine simulator as another preferred embodiment of the present invention further comprises mechanical system torque calculation means for calculating a mechanical system torque and a shaft system torque of said synchronous machine by using said electrical system torque calculated by said electrical system torque calculation means and a frequency of said electrical power system.

The synchronous machine simulator as another preferred embodiment of the present invention further comprises phase angle calculation means for calculating a phase angle of said synchronous machine by using said electrical system torque calculated by said electrical system torque calculation means and said mechanical system torque calculated by said mechanical system torque calculation means.

The synchronous machine simulator as another preferred embodiment of the present invention further comprises exciting voltage calculation means for calculating exciting voltage based on an exciting current of said synchronous machine.

In accordance with another preferred embodiment according to the present invention, a synchronous machine simulation method of calculating various simulation values, comprises the steps of converting real instantaneous values of a three phase voltage expressing a terminal voltage of a synchronous machine as a target of the simulation into spiral vectors of complex number, performing a symmetrical component conversion for said spiral vectors of complex number in order to calculate a positive-sequence component voltage, a negative-sequence component voltage, and a zero-sequence component voltage, and calculating an internal voltage of said synchronous machine by using said positive-sequence component voltage and a phase angle of said synchronous machine, and calculating a positive-sequence component current, a negative-sequence component current, and a zero-sequence component current by using said positive-sequence component voltage, said negative-sequence component voltage, and said zero-sequence component voltage calculated by said steps.

The synchronous machine simulation method as another preferred embodiment of the present invention further comprises a step of calculating real instantaneous values of a three phase current in said synchronous machine by performing a symmetrical component conversion for said positive-sequence component current, said negative-sequence component current, and said zero-sequence component current calculated.

The synchronous machine simulation method as another preferred embodiment of the present invention further comprises a step of calculating an active electric power and a reactive electrical power of said synchronous machine based on said positive-sequence component voltage, said negative-sequence component voltage, said zero-sequence component voltage, said positive-sequence component current, said negative-sequence component current, and said zero-sequence component current.

The synchronous machine simulation method as another preferred embodiment of the present invention further comprises a step of calculating an electrical system torque of said synchronous machine based on said calculation results such as said positive-sequence component voltage, said negative-sequence component voltage, said zero-sequence component voltage, said positive-sequence component current, said negative-sequence component current, and said zero-sequence component current.

The synchronous machine simulation method as another preferred embodiment of the present invention further comprises a step of calculating an active electric power, a reactive electrical power, and an electrical system torque of said synchronous machine based on said calculation results such as said positive-sequence component voltage, said negative-sequence component voltage, said zero-sequence component voltage, said positive-sequence component current, said negative-sequence component current, and said zero-sequence component current.

The synchronous machine simulation method as another preferred embodiment of the present invention further comprises a step of calculating real instantaneous values of a three phase current in said synchronous machine by performing a symmetrical component conversion for said positive-sequence component current, said negative-sequence component current, and said zero-sequence component current, and a step of calculating an active electric power, a reactive electrical power, and an electrical system torque of said synchronous machine based on said calculation results such as said positive-sequence component voltage, said negative-sequence component voltage, said zero-sequence component voltage, said positive-sequence component current, said negative-sequence component current, and said zero-sequence component current.

The synchronous machine simulation method as another preferred embodiment of the present invention further comprises a step of calculating a mechanical system torque of said synchronous machine by using said electrical system torque and a frequency of said electrical power system.

The synchronous machine simulation method as another preferred embodiment of the present invention further comprises a step of calculating a mechanical system torque and a shaft system torque of said synchronous machine by using said electrical system torque and a frequency of said electrical power system.

The synchronous machine simulation method as another preferred embodiment of the present invention further comprises a step of calculating a phase angle of said synchronous machine by using said electrical system torque and said mechanical system torque.

The synchronous machine simulation method as another preferred embodiment of the present invention further comprises a step of calculating an exciting voltage based on an exciting current of said synchronous. machine.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the synchronous machine simulator and the synchronous machine simulation method according to the present invention will now be described with reference to the drawings.

First embodiment

Figure 1:
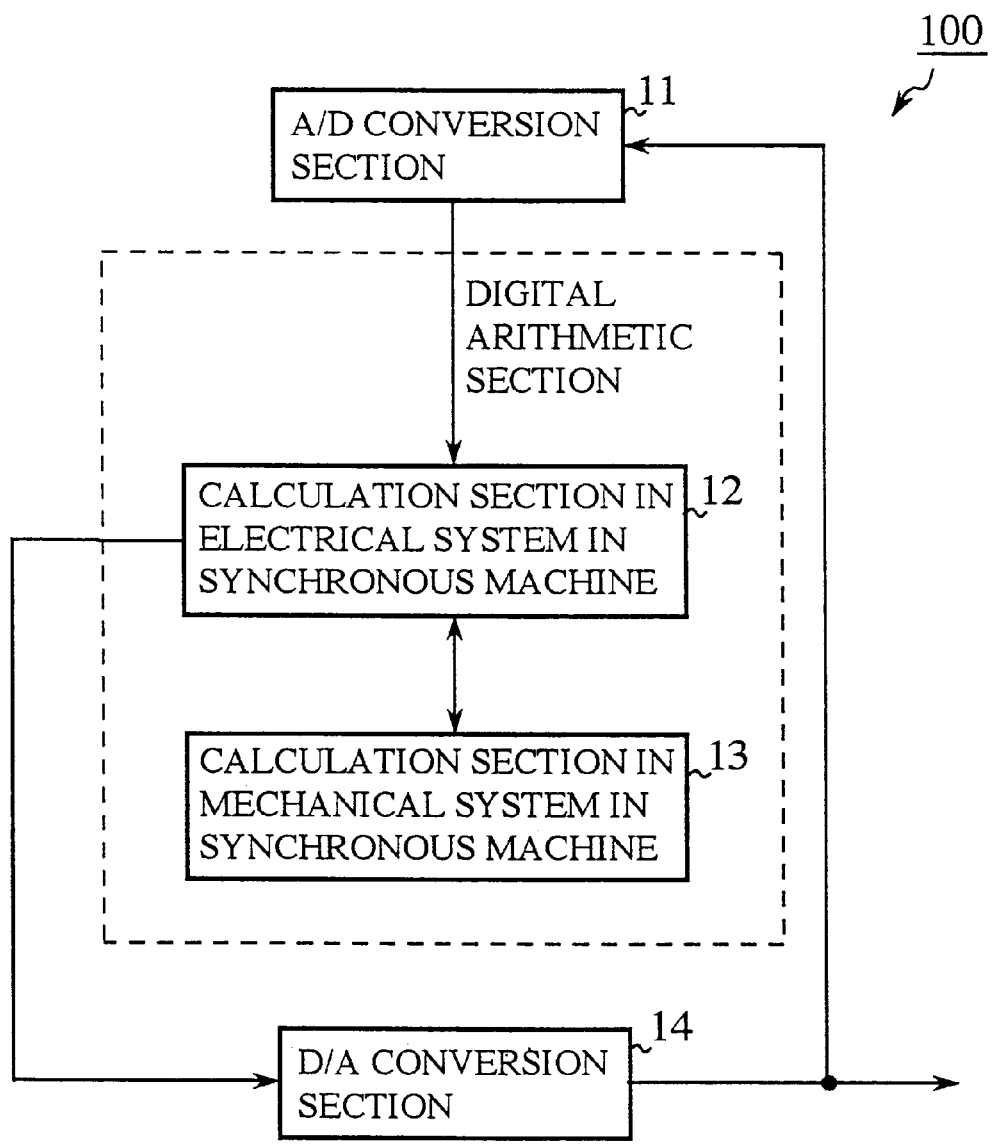
FIG. 1 is a block diagram showing a configuration of a synchronous machine simulator according to the first embodiment of the present invention.

FIG. 1 is a block diagram showing a configuration of the synchronous machine simulator according to the first embodiment of the present invention. In FIG. 1, the reference number 11 designates an Analogue to Digital (A/D) conversion section for performing the A/D conversion of real instantaneous values va_re, vb_re, vc_re of a three phase voltage expressing the terminal voltage of a synchronous machine to be a simulation target, for performing a spiral conversion for them, and for outputting digital values va, vb, and vc. The reference number 12 denotes an electrical system calculation section for calculating various values of the electrical system of the synchronous machine based on the digital values va, vb, and vc outputted from the A/D conversion section 12. The reference number 13 indicates a mechanical system calculation system for the synchronous machine for calculating various values of the mechanical system of the synchronous machine based on the calculated values obtained by the electrical system calculation section 12. The reference number 14 denotes a Digital to Analogue (D/A) conversion section for performing the D/A conversion of the calculation result of the electrical system calculation section 12 and for outputting real instantaneous values Re(ia), Re(ib), and Re(ic) of the three phase current.

Figure 2:
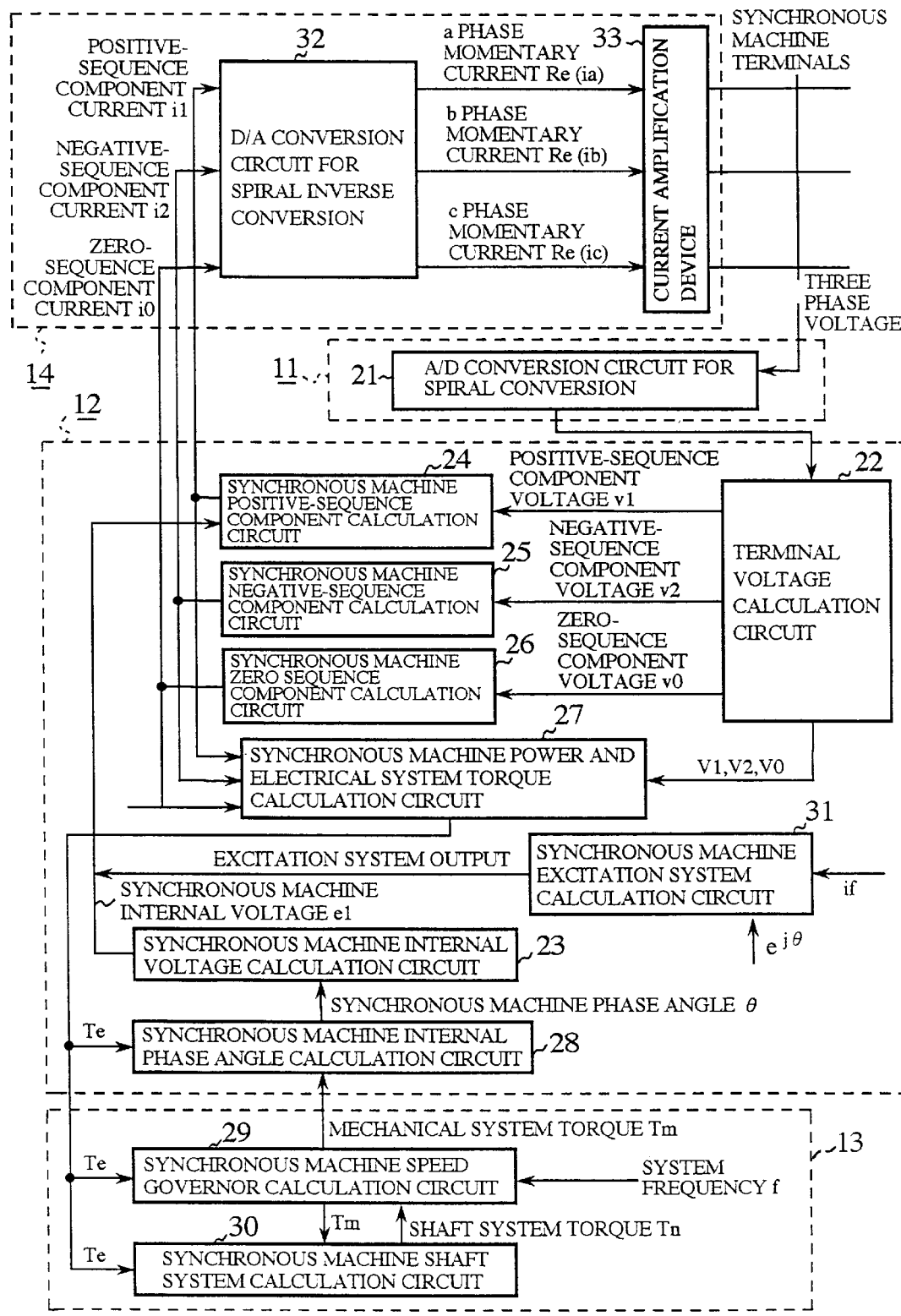
FIG. 2 is a block diagram showing a detailed configuration of the synchronous machine simulator according to the first embodiment of the present invention.

FIG. 2 is a block diagram showing a detailed configuration of the synchronous machine simulator according to the first embodiment of the present invention. In FIG. 2, the reference number 21 designates an A/D conversion circuit as a spiral conversion means for performing the A/D conversion of real instantaneous values va__re, vb__re, vc__re of the three phase voltage showing the terminal voltage of the synchronous machine and then for converting each phase voltage into each of spiral vectors va, vb, and vc of complex number. The reference number 22 denotes a terminal voltage calculation circuit as a voltage calculation means for performing a symmetrical component conversion for the spiral vectors va, vb, and vc of complex number that have been converted by the A/D conversion circuit 22 and for generating a positive-sequence component voltage v1, a negative-sequence component voltage v2, and a zero-sequence component voltage v0. The reference number 23 denotes an internal voltage calculation circuit for the synchronous machine as a voltage calculation means for calculating an internal voltage e1 of the synchronous machine by using the phase angle θ of the synchronous machine.

The reference number 24 designates a positive-sequence component calculation circuit for the synchronous machine for calculating a positive-sequence component current i1 based on the positive-sequence component voltage v1 calculated by the terminal voltage calculation circuit 22 and the internal voltage e1 of the synchronous machine calculated by the internal voltage calculation circuit 23 for the synchronous machine. The reference number 25 denotes a synchronous machine negative-sequence component voltage as a current calculation means for calculating a negative-sequence component current i2 by using the negative-sequence component voltage v2 calculated by the terminal voltage calculation circuit 22. The reference number 26 denotes a zero-sequence component calculation circuit as a current calculation means for the synchronous machine for calculating a zero-sequence component current i0 by using the zero-sequence component voltage v0 calculated by the terminal voltage calculation circuit 22. The reference number 27 designates an electrical power and electrical system torque calculation circuit for the synchronous machine as the electrical power calculation means and the electrical system torque calculation means for calculating an active electric power P. a reactive electrical power Q, and a torque Te of an electrical system by using the positive-sequence component voltage v1, the negative-sequence component voltage v2, the zero-sequence component voltage v0, the positive-sequence component current i1, the negative-sequence component current i2, and the zero-sequence component current i0.

The reference number 28 designates an internal phase angle calculation circuit as a voltage calculation means and a phase angle calculation means for calculating a phase angle θ for the synchronous machine by using the electrical system torque Te calculated by the electrical power and electrical system torque calculation circuit 27 and the mechanical system torque Tm calculated by the speed governor system calculation circuit 29 for the synchronous machine. The reference number 29 indicates a speed governor system calculation circuit as the mechanical system torque calculation means for the synchronous machine for calculating the electrical system torque Te calculated by the electrical power and electrical system torque calculation circuit 27 and the shaft system torque Tn calculated by the shaft system calculation circuit 30 for the synchronous machine and the frequency "f" of the electrical system. The reference number 30 designates a shaft system calculation circuit as a mechanical system torque calculation means for the synchronous machine for calculating a shaft system torque Tn by using the electrical system torque Te calculated by the electrical power and electrical system torque calculation circuit 27 and the mechanical system torque Tm calculated by the speed governor system calculation circuit 29 for the synchronous machine. The reference number 31 denotes an exciting system calculation circuit as an exciting voltage calculation means for the synchronous machine for calculating an exciting voltage vf based on the exciting current if of the synchronous machine. In addition, the reference number 32 designates a digital to analogue (D/A) conversion circuit as a spiral inverse conversion means for performing a symmetrical component method for the positive-sequence component current i1, the negative-sequence component current i2, and the zero-sequence component current i3 in order to obtain the real instantaneous values Re(ia), Re(ib), and Re(ic) of the three phase current. The reference number 33 denotes an amplification device for amplifying the real instantaneous values Re(ia), Re(ib), and Re(ic) of the three phase current outputted from the D/A conversion circuit 32.

Figure 3:
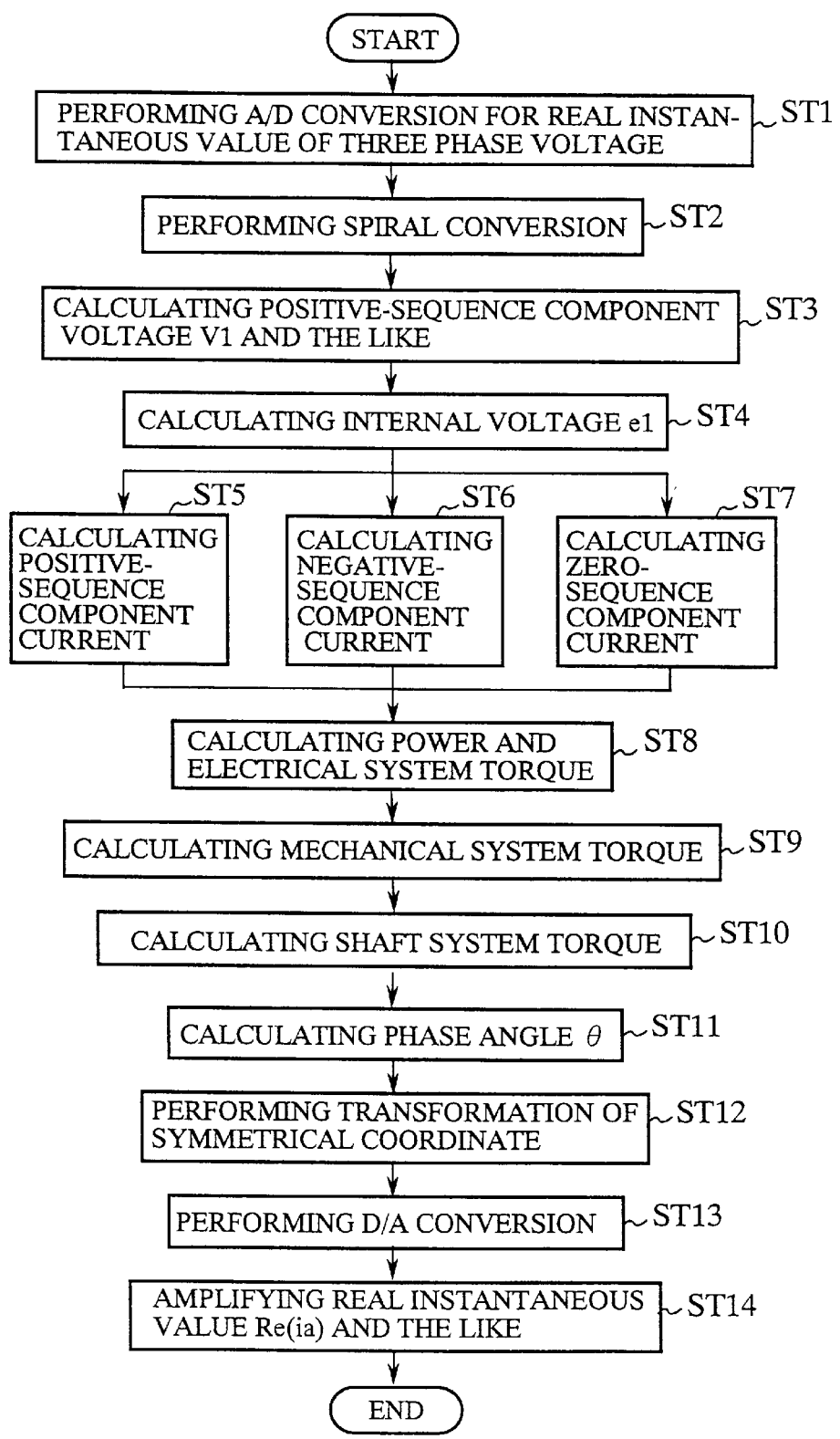
FIG. 3 is a flow chart showing a synchronous machine simulation method as the first embodiment according to the present invention.

FIG. 3 is a flow chart showing a synchronous machine simulation method executed by the synchronous machine simulator 100 as the first embodiment according to the resent invention.

Next, a description will be given of the operation of the synchronous machine simulator 100 as the first embodiment.

Figure 5:
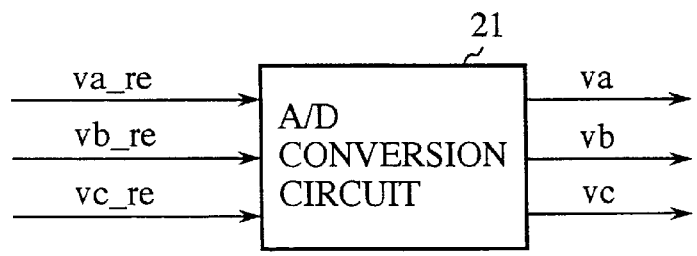
FIG. 5 is a circuit block diagram showing an A/D conversion circuit.

FIG. 5 is a circuit block diagram showing the A/D conversion circuit 21. First, when the synchronous machine simulator 100 starts the simulation of a synchronous machine, the A/D conversion circuit 21, as also shown in FIG. 5, receives the real instantaneous values va__re, vb__re, and vc__re of the three phase voltage as the terminal voltage of the synchronous machine and performs the Analogue to Digital (A/D) conversion of the real instantaneous values va__re, vb__re, and vc__re (Step ST1).

After performing the A/D conversion for the real instantaneous values va__re, Vb__re, and Vc__re, the A/D conversion circuit 21 converts the voltage of each phase to each of the spiral vectors Va, vb, and vc in complex number (Step ST2).

Figure 4:
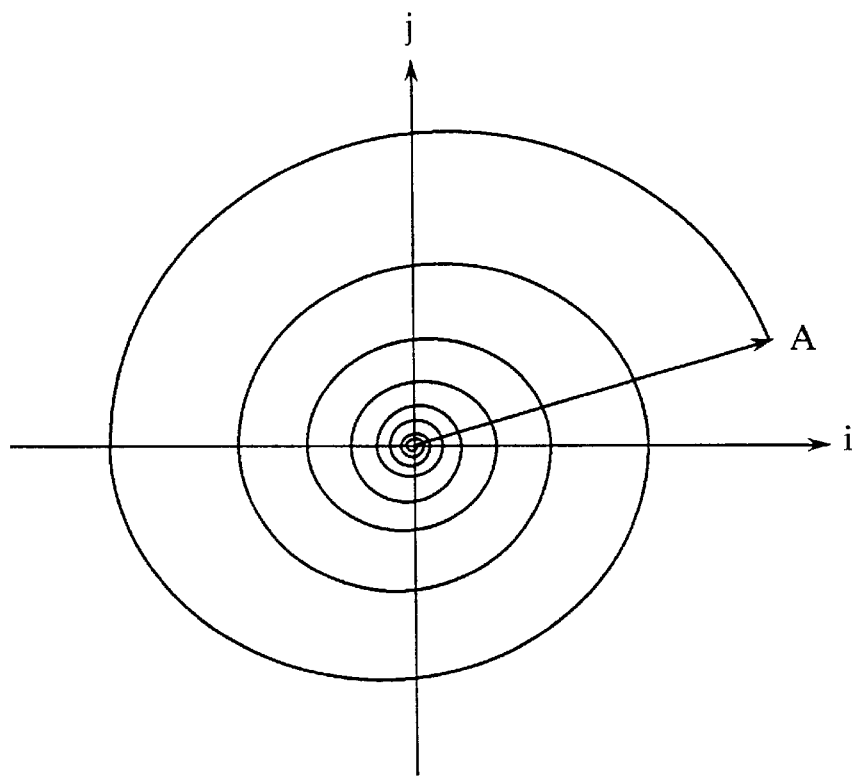
FIG. 4 is a vector diagram showing a spiral vector.
Figure 6:
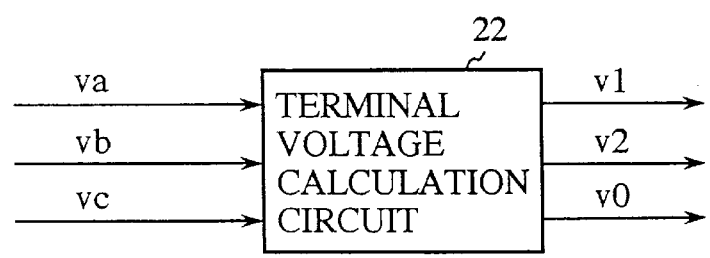
FIG. 6 is a circuit block diagram showing a terminal voltage calculation circuit.

The spiral vectors are shown in the following equation (1). The spiral vector is a vector that is attenuating while it rotates counter-clockwise in a complex plane. FIG. 4 is a vector diagram showing the spiral vector. In an actual case of the electrical power system, because the AC voltage and AC current are changed in magnitude, the spiral vector, as shown in FIG. 4, may express most accurately the voltage and current in synchronous machines.

$$X = Ae^{\delta t}, \delta = -\lambda + jw; \qquad (1)$$

where A is an optional variable, λ is an attenuation constant, and δ is a rotate angular velocity. FIG. 6 is a circuit block diagram showing the terminal voltage calculation circuit 22. When the A/D conversion circuit 21 converts the real instantaneous values va_re, vb_re, and vc_re of the three phase voltage into the spiral vectors va, vb, and vc, the terminal voltage calculation circuit 22 shown in FIG. 6 performs the symmetrical component method for the spiral vectors va, vb, and vc in order to calculate and generate the positive-sequence component voltage v1, the negative-sequence component voltage v2, and the zero-sequence component voltage v0 (Step ST3).

$$\begin{bmatrix} v0 \\ v1 \\ v2 \end{bmatrix} = \frac{1}{3} \begin{bmatrix} 1 & 1 & 1 \\ 1 & \alpha^2 & \alpha \\ 1 & \alpha & \alpha^2 \end{bmatrix} \begin{bmatrix} va \\ vb \\ vc \end{bmatrix}, \quad (2)$$

where $\alpha = e^{-j(2/3)\pi}$, $\alpha^2 = e^{j(2/3)\pi}$, $\alpha^3 = 1$.

Figure 7:
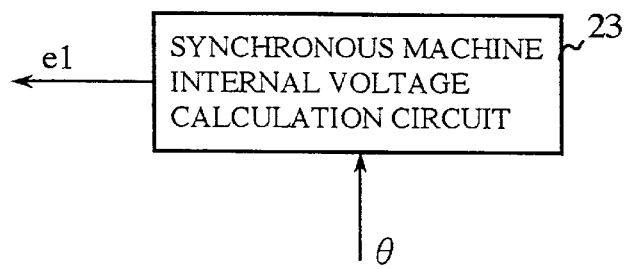
FIG. 7 is a circuit block diagram showing a synchronous machine internal voltage calculation circuit.

FIG. 7 is a circuit block diagram showing the internal voltage calculation circuit 23. On the other hand, the internal voltage calculation circuit 23, as also shown in FIG. 7, calculates the internal voltage e1 of the synchronous machine by using the phase angle θ of the synchronous machine (Step ST4).

$$e1 = j\omega\lambda e^{j\theta} = \sqrt{2}E1 \ e^{j\theta}, \quad (3)$$

where E1 is an active value of the internal voltage e1.

Figure 8:
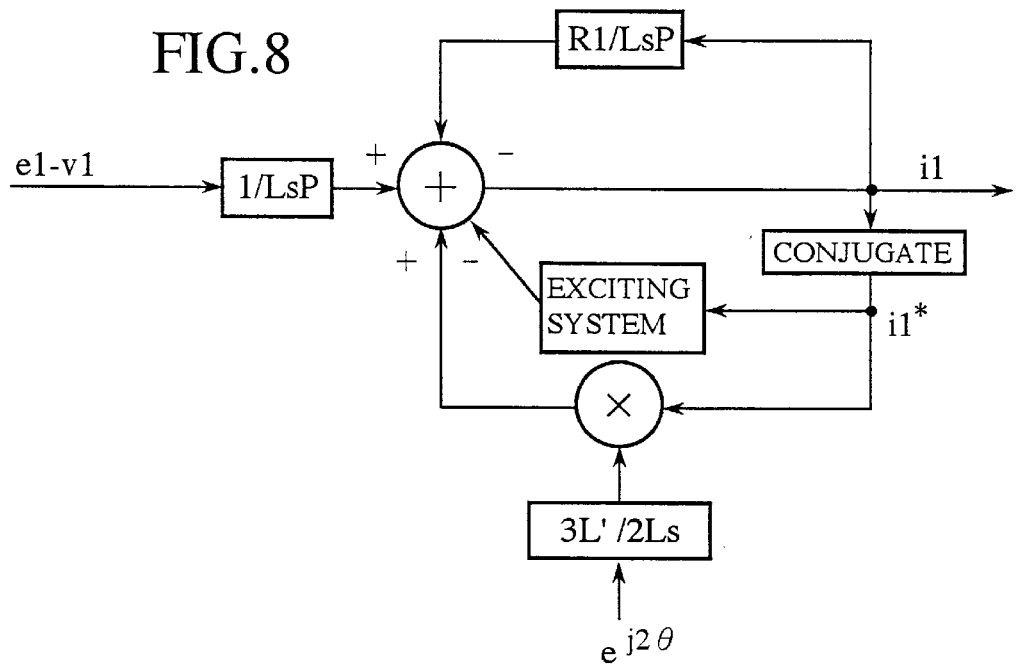
FIG. 8 is a circuit block diagram showing a synchronous machine positive-sequence component calculation circuit.

FIG. 8 is a circuit block diagram showing the positive-sequence component calculation circuit 24. After the completion of the symmetrical component method executed by the terminal voltage calculation circuit 22, the positive-sequence component calculation circuit 24, as also shown in FIG. 8, calculates inserts the positive voltage v1 calculated by the terminal voltage calculation circuit 22 and the internal voltage e1 of the synchronous machine that has been calculated by the internal voltage calculation circuit 23 into the following equation (4) in order to calculate the positive current i1 of the synchronous machine (Step ST5).

$$i1 = \frac{e1 - v1}{L_s}P - \frac{R1}{L_sP}i1 + 3\frac{L'}{2L_s}(e^{j2\theta}i1^*), \quad (4)$$

Where, i1* is a conjugate current of a positive-sequence component i1, Ls is a synchronous inductance, R1 is an armature resistance, L' is the maximum value of a self-conductance of a winding of each phase in the synchronous machine, and P is a differential operator (p=d/dt), Ls=l1+(3/2)L, where l1 is a leakage inductance of each phase in the synchronous machine, and L is a mean value of the self-inductance of each phase in the synchronous machine.

Figure 9:
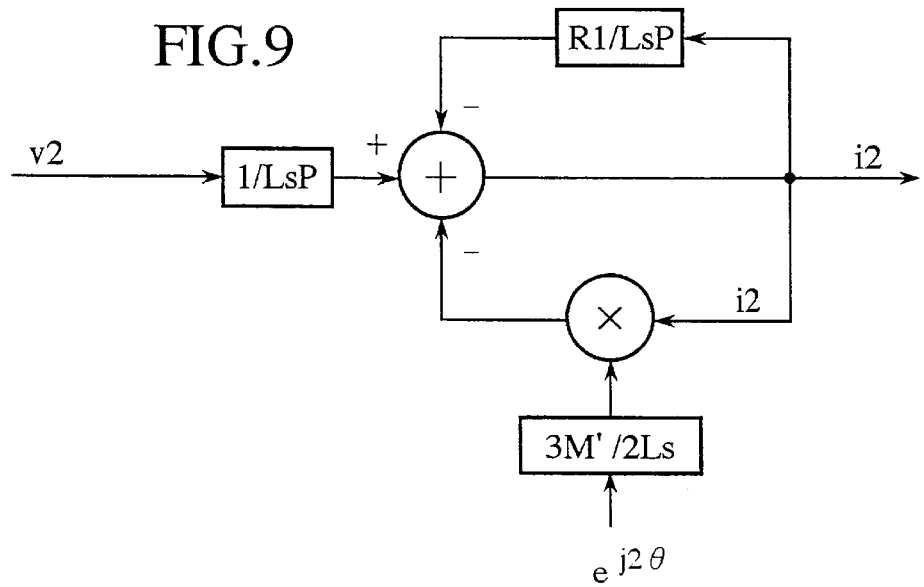
FIG. 9 is a circuit block diagram showing a synchronous machine negative-sequence component calculation circuit.

FIG. 9 is a circuit block diagram showing the negative-sequence component calculation circuit 25. In addition, after the completion of the symmetrical component method executed by the terminal voltage calculation circuit 22, the negative-sequence component calculation circuit 25, as also shown in FIG. 9, calculates a negative-sequence component current i2 by inserting the negative-sequence component voltage v2 into the following equation (5) (Step ST6).

$$i2 = \frac{v2}{L_sP} - \frac{R1}{L_sP}i2 + \frac{3L'}{2L_s}(e^{j2\theta}i2^*), \quad (5)$$

where, i2* is a conjugate current of a negative-sequence component current i2.

Figure 10:
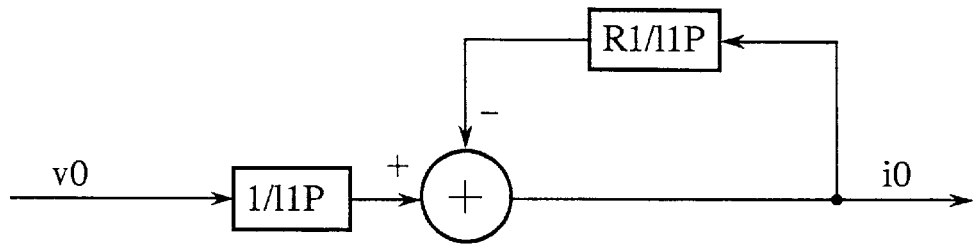
FIG. 10 is a circuit block diagram showing a synchronous machine zero-sequence component calculation circuit.

FIG. 10 is a circuit block diagram showing the zero-sequence component calculation circuit 26. Furthermore, after the completion of the symmetrical component method executed by the terminal voltage calculation circuit 22, the zero-sequence component calculation circuit 26, as also shown in FIG. 10, calculates a zero-sequence component current i0 by inserting the sero phase voltage v0 calculated by the terminal voltage calculation circuit 22 (Step ST7).

$$i0 = \frac{v0}{l1P} - \frac{R1}{l1P}i0. \quad (6)$$

Figure 11:
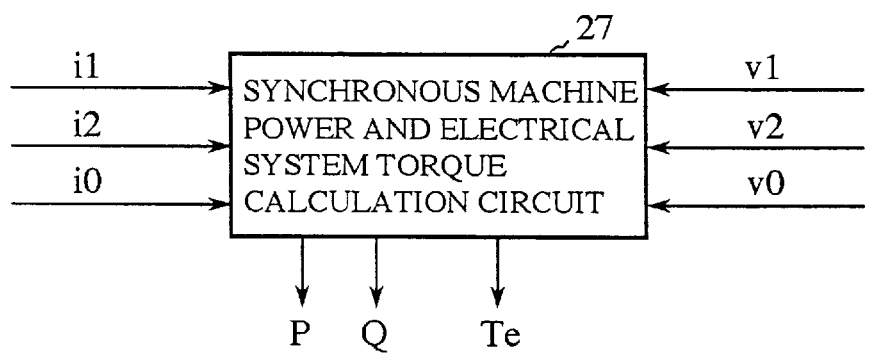
FIG. 11 is a circuit block diagram showing a synchronous machine electrical power system torque calculation circuit.

FIG. 11 is a circuit block diagram showing the electrical power and electrical system torque calculation circuit 27. Furthermore, after the completion of the calculation of the positive-sequence component current i1, the negative-sequence component current i2, and the zero-sequence component current i0, the electrical power and mechanical system torque calculation circuit 27, as also shown in FIG. 11, calculates an active electric power P, a reactive electrical power Q, and a torque Te of the electrical system in the synchronous machine by inserting the positive current i1 and the like into the following equations (7) to (14).

$Pe$ positive-sequence component=(3/2) $Re$ ($v1$ $i1^*$)    (7), $Qe$ positive-sequence component=(3/2) $Im$ ($v1$ $i1^*$)    (8), $Pe$ negative-sequence component=(3/2) $Re$ ($v2$ $i2^*$)    (9), $Qe$ positive-sequence component=(3/2) $Im$ ($v2$ $i2^*$)    (10), $Pe$ zero-sequence component=(3/2) $Re$ ($v0$ $i0^*$)    (11), $Qe$ zero-sequence component=(3/2) $Im$ ($v0$ $i0^*$)    (12), $Pe$=(3/2)$Re$($v0$ $i0^*$+$v1$ $i1^*$+$v2$ $i2^*$)    (13), $Qe$=(3/2)$Im$($v0$ $i0^*$+$v1$ $i1^*$+$v2$ $i2^*$)    (14), where, the Pe positive-sequence component is the active electric power of the positive-sequence component circuit, the Qe positive-sequence component is the reactive electrical power of the positive-sequence component circuit, the Pe negative-sequence component is the active electric power of the negative-sequence component circuit, the Qe negative-sequence component is the reactive electrical power of the negative-sequence component circuit, the Pe zero-sequence component is the active electric power of the zero-sequence component circuit, the Qe zero-sequence component is the reactive electrical power of the zero-sequence component circuit, Pe is the active electric power of the three phase, and Qe is the reactive electrical power of the three phase, $Te$ positive-sequence component=(3$P$/2ω)$Re$($v1$ $i1^*$),    (15)

$Te$ negative-sequence component=(3$P$/2ω)$Re$($v2$ $i2^*$),and    (16)

$Te$ zero-sequence component=(3$P$/2ω)$Re$($v0$ $i0^*$),    (17)

where, Te positive-sequence component is the positive-sequence component torque of the electrical system, Te negative-sequence component is the negative-sequence component torque of the electrical system, Te zero-sequence component is the zero-sequence component torque of the electrical system, P is the number of poles in the synchronous machine, and ω is a rotation angular velocity in the synchronous machine.

Figure 12:
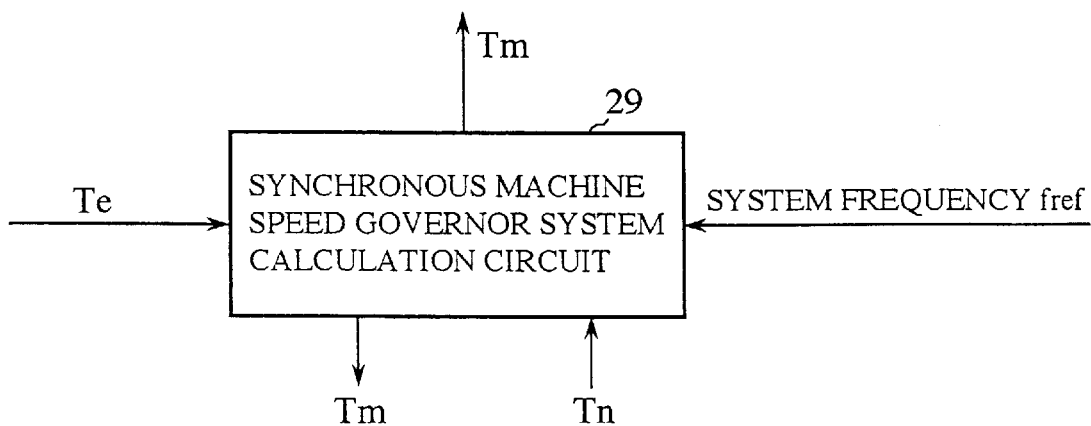
FIG. 12 is a circuit block diagram showing a synchronous machine speed governor calculation circuit.

FIG. 12 is a circuit block diagram showing the speed governor calculation circuit 29. After the electrical power and electrical system torque calculation circuit 27 calculates the electrical system torque of the synchronous machine, the speed governor calculation circuit 29, as also shown in FIG. 12, calculates a mechanical system torque Tm of the synchronous machine based on the electrical system torque Te and the shaft system torque and the frequency of the electrical power system (Step ST9).

That is, although there are many kinds of speed governor systems in synchronous machines such as, an nuclear power, a thermal power, a hydraulic power, and the like, it is possible to express them into the following equations (18) and (19):

$$Tm = f \text{ (Te positive-sequence component, Te negative-sequence component, Tn, fref)}, \quad (18)$$

where, fref is a frequency of an electrical power system, and $$\Delta Tm = \Delta Te \text{ positive-sequence component} - \Delta Te \text{ negative-sequence component} + \Delta Tn + Kfref, \quad (19)$$

where, K is a system constant.

Figure 13:
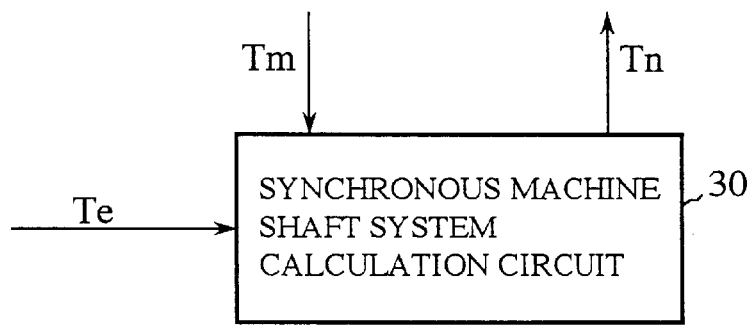
FIG. 13 is a circuit block diagram showing a synchronous machine shaft system calculation circuit.

FIG. 13 is a circuit block diagram showing the shaft system calculation circuit 39. In addition, when the electrical system torque Te of the synchronous machine is calculated by the electrical power and electrical system torque calculation circuit 27 by the electrical power and electrical system torque calculation circuit 27, the shaft system calculation circuit 39, as also shown in FIG. 13, calculates a shaft system torque Tn by using the electrical system torque Te and the mechanical system torque Tm calculated by the speed governor system calculation system 29 (Step ST10).

That is, although there are many kinds of speed governor systems in synchronous machines, it is possible to express them into the following equations (20) and (21). Accordingly, it may be said that the output of the shaft system has the close connection to the electrical system torque and the output of the speed governor system. By the way, although the first embodiment shown the following two equations (20) and (21), in general, one of them is used.

$$Tn = f(\text{Te positive-sequence component, Te negative-sequence component, Tm}), \quad (20)$$

and $$\Delta Tn = \Delta Te \text{ positive-sequence component} - \Delta Te \text{ negative-sequence component} + \Delta Tm. \quad (21)$$

Figure 14:
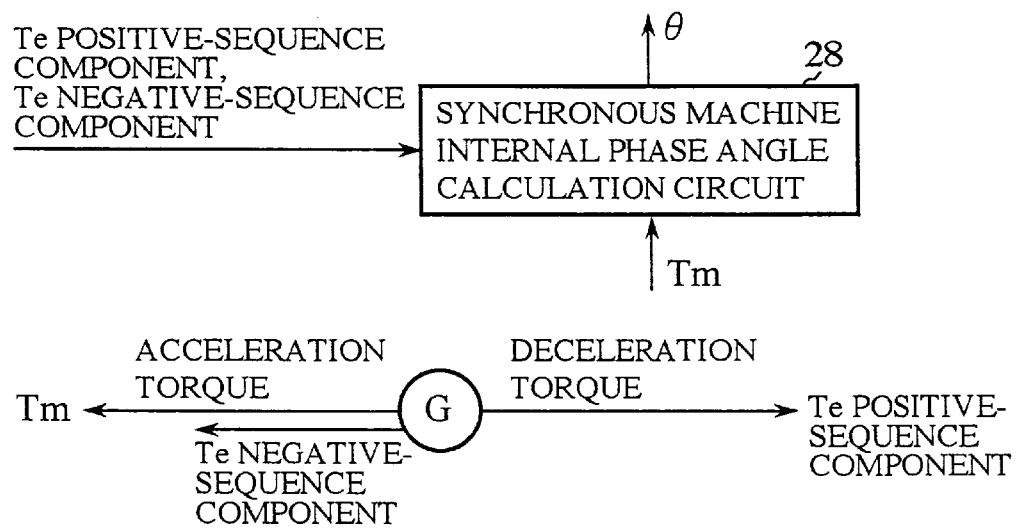
FIG. 14 is a circuit block diagram showing an internal phase angle calculation circuit.

FIG. 14 is a circuit block diagram showing the internal phase angle calculation circuit 28. After the mechanical system torque Tm is calculated by the speed governor system calculation circuit 29, the internal phase angle calculation circuit 28, as also shown in FIG. 14, calculates an phase angle θ by inserting the mechanical system torque Tm, the electrical system torque Te calculated by the electrical power and electrical system torque calculation circuit 27 into the following equation (22) (Step ST11).

Because it is apparent from the following equations (22) and (23), that is, because there are no relationship between the zero-sequence component torque of the electrical system and the mechanical system, it can be considered that there is no effect of any change of the internal phase angle in the synchronous machine.

$$M \frac{d\theta}{dt^2} = Tm - Te \text{ positive-} \quad (22)$$

sequence component + Te negative- sequence component, $$\Delta \theta = \quad (23)$$

$$\frac{1}{M} \int\int (Tm - Te \text{ positive-sequence component} + Te \text{ negative-}$$

sequence component)dt.

Figure 15:
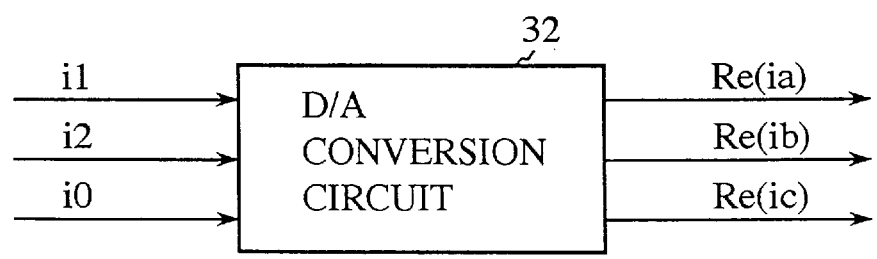
FIG. 15 is a circuit block diagram showing a D/A conversion circuit.

FIG. 15 is a circuit block diagram showing the D/A conversion circuit 32. In addition, as described above, the positive-sequence component current i1, the negative-sequence component current i2, and the zero-sequence component current i0 that have been calculated by the positive-sequence component calculation circuit 24 and the like are inputted into the D/A conversion circuit 32 shown in FIG. 15. After this process, the D/A conversion circuit 32 performs the symmetrical component method for the positive-sequence component current i1, the negative-sequence component current i2, and the zero-sequence component current i3 in order to calculate the three phase currents ia, ib, and ic in digital form (Step ST12). Then, the D/A conversion circuit 32 performs the D/A conversion in order to convert the three phase currents ia, ib, and ic into the real instantaneous values Re(ia), Re(ib), and Re(ic) of the three phase currents in analogue form, and the D/A conversion circuit 32 outputs them (Step ST13).

$$\begin{bmatrix} ia \\ ib \\ ic \end{bmatrix} = \begin{bmatrix} 1 & 1 & 1 \\ 1 & \alpha & \alpha^2 \\ 1 & \alpha^2 & \alpha \end{bmatrix} \begin{bmatrix} i0 \\ i1 \\ i2 \end{bmatrix}. \quad (24)$$

Figure 16:
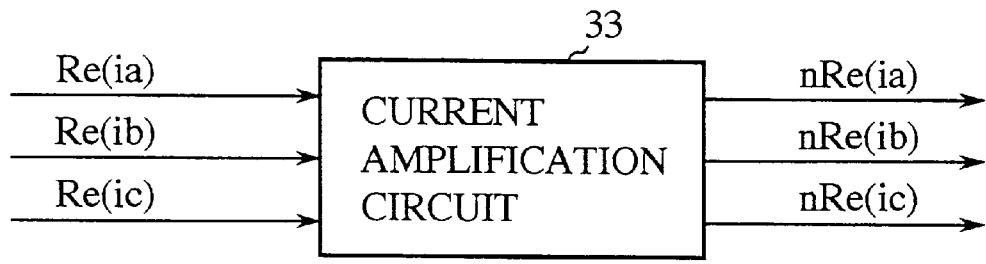
FIG. 16 is a circuit block diagram showing a current amplification device.

FIG. 16 is a circuit block diagram showing the current amplification device 33. Further, after the D/A conversion circuit 32 outputs the real instantaneous values Re(ia), Re(ib), and Re(ic) of the three phase current in analogue form, the current amplification circuit 33, as also shown in FIG. 16, amplifies the real instantaneous values Re(ia), Re(ib), and Re(ic) of the three phase current in analogue form (Step ST14). Thus, the synchronous machine simulator 100 performs the simulation for the synchronous machine as described above.

Figure 17:
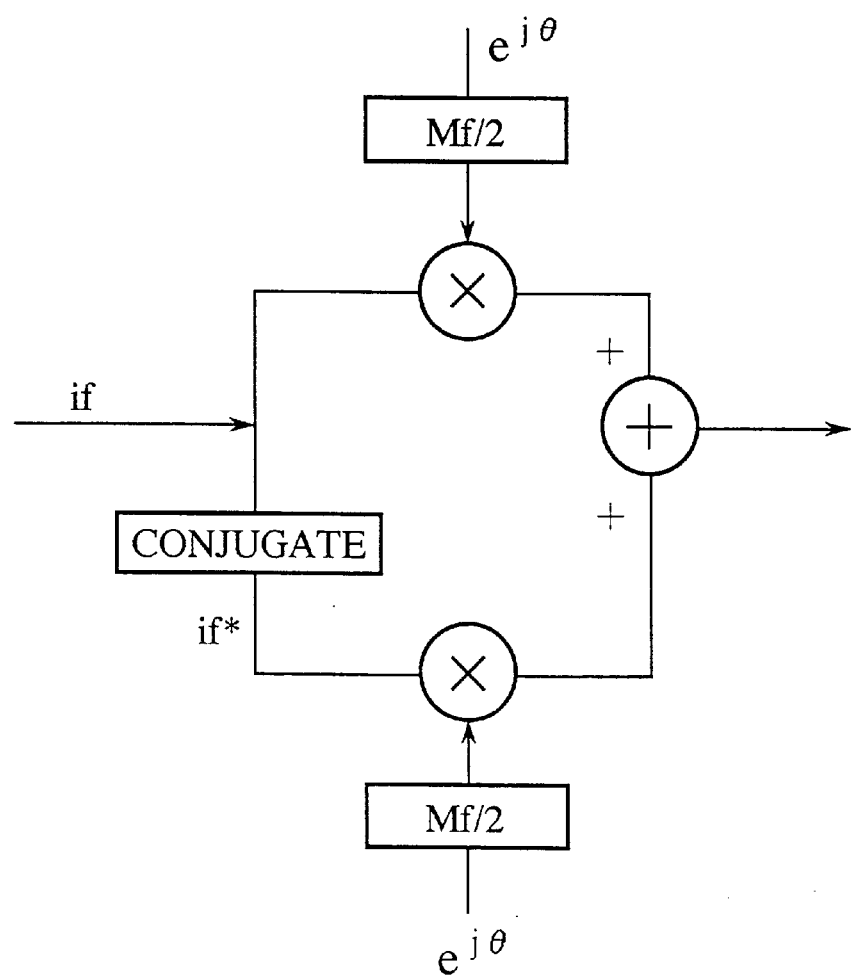
FIG. 17 is a circuit block diagram showing a synchronous machine exciting system calculation circuit.
Figure 18:
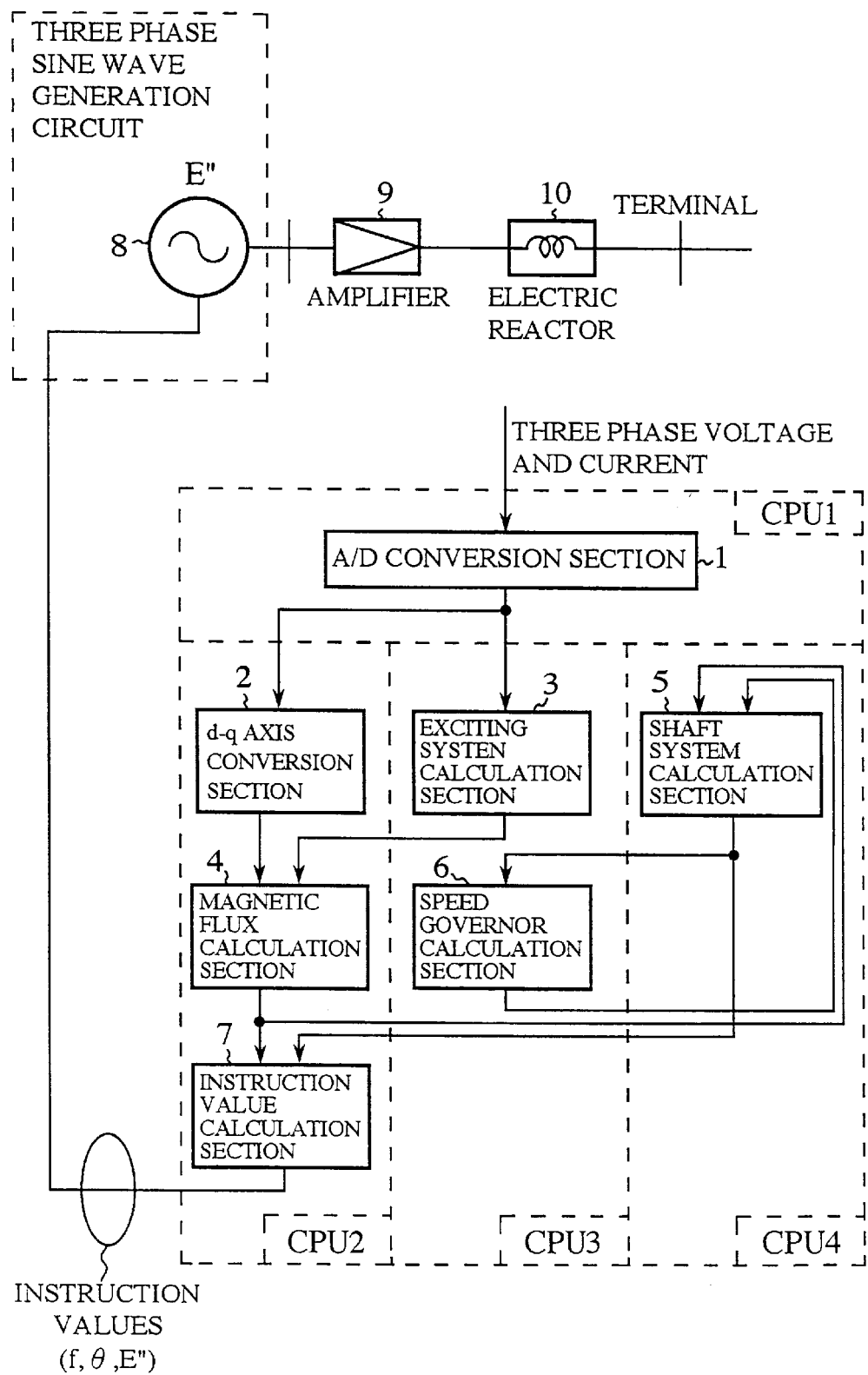
FIG. 18 is a diagram showing a configuration of a conventional synchronous machine simulator.

FIG. 17 is a circuit block diagram showing the exciting system calculation circuit. In addition, the exciting system calculation circuit, as also shown in FIG. 17, may perform the simulation for the exciting voltage vf because it calculate the exciting voltage vf by inserting the exciting current if of the synchronous machine into the following equation (25).

$$Vf = Rfif + (lf = Mf)pif + \frac{3}{2} MfP[e^{j\theta} if^*], \quad (25)$$

Where, if* is a conjugate current of an exciting current if, Rf is a resistance of an exciting system, lf is a self-inductance of the exciting system, and Mf is a mutual inductance.

As apparent from the above description, according to the first embodiment, the real instantaneous values va_re, vb_re, and vc_re of the three phase voltage showing the terminal voltage of the synchronous machine are converted into the spiral vectors va, vb, and vc. In addition to this operation, according to the first embodiment, the positive current i1 is calculated based on the above conversion result and the positive current i1 is then treated in the symmetrical component method in order to obtain the read instantaneous values Re(ia), Re(ib), and Re(ic) of the three phase current. Therefore the first embodiment has the effect that it is possible to simulate the synchronous machine by using only AC values without any converting various values of the electrical system in the synchronous machine into DC values, those operation must be performed in the conventional synchronous machine simulator.

Second embodiment

The description for the synchronous machine simulator as the first embodiment shown in FIGS. 1 to 17 has described only the case in which the synchronous machine has an exciting system such as a permanent magnet when the positive-sequence component current i1 is calculated. However, the present invention is not limited by the example described in the first embodiment, for example, it is also acceptable that the synchronous machine simulator and the method therefor as the second embodiment according to the present invention has an exciting system of a direct current (DC) exciting system based on the following equation (26). In this case, it is also possible to have the same effect of the synchronous machine simulator and the simulation method therefor of the first embodiment.

$$i1 = \frac{e1 - v1}{L_s P} - \frac{R1}{L_s P}i1 + \frac{3L'}{2L_s}(e^{j2\theta}i1^*) - \frac{Mf}{2}(e^{j\theta}if + e^{j\theta}if^*) \qquad (26)$$

Where, if* is a conjugate current of an exciting current if, Rf is a resistance of an exciting system, lf is a self-inductance of the exciting system, Mf is a mutual inductance, i1* is a conjugate current, Ls is a synchronous inductance, R1 is an armature resistance, L' is the maximum value of a self conductance of a winding of each phase in the synchronous machine, P is a differential operator (p=d/dt), Ls=l1+(3/2)L, l1 is a leakage inductance of each phase in the synchronous machine, and L is a mean value of the self-inductance of each phase in the synchronous machine.

As set forth, according to the present invention, because the synchronous machine simulator and the synchronous machine simulation method have the spiral conversion means for converting the real instantaneous values expressing the terminal voltages of the synchronous machine into the spiral vectors of complex number, and because the synchronous machine simulator calculates positive-sequence component currents and the like based on the conversion result of the spiral conversion means, and because real instantaneous values of the three phase current are calculated by performing the symmetrical component conversion of the positive-sequence component currents and the like, it is possible to simulate various AC values of the electrical system in the synchronous machine without converting the AC values into DC values. Therefore the synchronous machine simulator of the present invention has the effect that it is possible to simulate a transient phenomena of the electrical system in the synchronous machine accurately.

In addition, according to the present invention, because the synchronous machine simulator and the synchronous machine simulation method have the spiral conversion means for converting the real instantaneous values of a three phase voltage showing the terminal voltage of the synchronous machine into spiral vectors of complex number, and because an active electric power and a reactive electrical power of the synchronous machine are calculated based on the conversion result of the spiral conversion means, therefore, the synchronous machine simulator of the present invention has the effect that it is possible to simulate the active electric power and the reactive electrical power of the electrical system in the synchronous machine accurately.

Furthermore, according to the present invention, because the synchronous machine simulator and the synchronous machine simulation method have the spiral conversion means for converting the real instantaneous values of a three phase voltage showing the terminal voltage of the synchronous machine into spiral vectors of complex number, and because an electrical system torque of the synchronous machine is calculated based on the conversion result of the spiral conversion means, therefore, the synchronous machine simulator of the present invention has the effect that it is possible to simulate the electrical system torque of the electrical system in the synchronous machine accurately.

Moreover, according to the present invention, because the synchronous machine simulator and the synchronous machine simulation method have the spiral conversion means for converting the real instantaneous values of a three phase voltage showing the terminal voltage of the synchronous machine into spiral vectors of complex number, and because an active electric power, a reactive electrical power, and an electrical system torque of the synchronous machine are calculated based on the conversion result of the spiral conversion means, therefore, the synchronous machine simulator of the present invention has the effect that it is possible to simulate the active electric power, the reactive electrical power, and the electrical system torque of the electrical system in the synchronous machine accurately.

In addition, according to the present invention, because the synchronous machine simulator and the synchronous machine simulation method have the spiral conversion means for converting the real instantaneous values of a three phase voltage showing the terminal voltage of the synchronous machine into spiral vectors of complex number, and because a positive-sequence component current and an electrical system torque and the like of the synchronous machine are calculated based on the conversion result of the spiral conversion means and real instantaneous values of the three phase current are calculated by performing the symmetrical component conversion for the positive-sequence component current and the like, it is possible to simulate the synchronous machine only by using AC values without converting various values of the electrical system in the synchronous machine, like the conventional simulator. Therefore the synchronous machine simulator of the present invention has the effect that it is possible to simulate a transient phenomena of the electrical system in the synchronous machine accurately.

Furthermore, according to the present invention, because the synchronous machine simulator and the synchronous machine simulation method have the electrical system torque calculation means for calculating an electrical system torque, and because a mechanical system torque of the synchronous machine is calculated by using the electrical system torque and a frequency of the electrical power system, the synchronous machine simulator of the present invention has the effect that it is possible to simulate the mechanical system torque of the synchronous machine accurately.

Moreover, according to the present invention, because the synchronous machine simulator and the synchronous machine simulation method have the electrical system torque calculation means for calculating an electrical system torque, and because a mechanical system torque and a shaft system torque of the synchronous machine are calculated by using the electrical system torque and a frequency of the electrical power system, the synchronous machine simulator of the present invention has the effect that it is possible to simulate the mechanical system torque and the shaft system torque of the synchronous machine accurately.

Furthermore, according to the present invention, because the synchronous machine simulator and the synchronous machine simulation method have the electrical system torque calculation means and the mechanical system torque calculation means for calculating an electrical system torque and a mechanical system torque, and because a phase angle of the synchronous machine is calculated by using the electrical system torque and the mechanical system torque, the synchronous machine simulator of the present invention has the effect that it is possible to simulate the phase angle of the synchronous machine accurately.

In addition, according to the present invention, because the synchronous machine simulator and the synchronous machine simulation method calculates an exciting current of the synchronous machine based on an exciting current of the synchronous machine, the synchronous machine simulator of the present invention has the effect that it is possible to simulate the exciting voltage of the synchronous machine accurately.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A synchronous machine simulator comprising:

spiral conversion means, connected to a rotating synchronous electrical machine as an object of simulation for inputting a three phase voltage received through terminals of the synchronous machine, for performing an analog to digital conversion of real instantaneous values of the three phase voltage, and for converting the real instantaneous values of the three phase voltage into spiral vectors;

voltage calculation means for performing a symmetrical component conversion of the spiral vectors to calculate a positive-sequence component voltage, a negative-sequence component voltage, and a zero-sequence component voltage, and for calculating an internal voltage of the synchronous machine using the positive-sequence component voltage and a phase angle of the synchronous machine;

current calculation means for calculating a positive-sequence component current, a negative-sequence component current, and a zero-sequence component current using the positive-sequence component voltage, the negative-sequence component voltage, and the zero-sequence component voltage calculated by said voltage calculation means; and spiral inverse conversion means for calculating real instantaneous values of a three phase current in the synchronous machine by performing a symmetrical component conversion for the positive-sequence component current, the negative-sequence component current, and the zero-sequence component current calculated by said current calculation means, and for outputting the real instantaneous values of the three phase current, wherein said synchronous machine simulator simulates a backswing characteristic, an asymmetrical three phase characteristic, instantaneous transient current, instantaneous transient voltage, instantaneous active electric power, instantaneous reactive electric power, instantaneous electrical system torque, instantaneous mechanical system torque, system shaft torque, phase angle, and exciting voltage based on the values calculated by said spiral inverse conversion means, said spiral conversion means, said voltage calculation means, and said current calculation means.

2. The synchronous machine simulator as claimed in claim 1, further comprising electrical power calculation means for calculating and simulating changes in the instantaneous active electric power and the instantaneous reactive electric power of the synchronous machine based on the positive-sequence component voltage, the negative-sequence component voltage, the zero-sequence component voltage, the positive-sequence component current, the negative-sequence component current, and the zero-sequence component current calculated by said voltage calculation means and said current calculation means.

3. The synchronous machine simulator as claimed in claim 1, further comprising electrical system torque calculation means for calculating and simulating changes in the electrical system torque of the synchronous machine based on the calculation results such as the positive-sequence component voltage, the negative-sequence component voltage, the zero-sequence component voltage, the positive-sequence component current, the negative-sequence component current, and the zero-sequence component current calculated by said voltage calculation means and said current calculation means.

4. The synchronous machine simulator as claimed in claim 3, further comprising mechanical system torque calculation means for calculating and simulating changes in the mechanical system torque of the synchronous machine using the electrical system torque calculated by said electrical system torque calculation means and frequency of the electrical system.

5. The synchronous machine simulator as claimed in claim 4, further comprising phase angle calculation means for calculating and simulating changes in the phase angle of the synchronous machine using the electrical system torque calculated by said electrical system torque calculation means and the mechanical system torque calculated by said mechanical system torque calculation means.

6. The synchronous machine simulator as claimed in claim 3, further comprising mechanical system torque calculation means for calculating and simulating changes in the mechanical system torque and the shaft system torque of the synchronous machine using the electrical system torque calculated by said electrical system torque calculation means and frequency of the electrical system.

7. The synchronous machine simulator as claimed in claim 1, further comprising:

electrical power calculation means for calculating and simulating changes in the instantaneous active electric power and instantaneous reactive electric power of the synchronous machine based on calculation results of said voltage calculation means and said current calculation means; and electrical system torque calculation means for calculating and simulating changes in the electrical system torque of the synchronous machine based on calculation results calculated by said voltage calculation means and said current calculation means.

8. The synchronous machine simulator as claimed in claim 1, further comprising:

electrical power calculation means for calculating and simulating changes in the instantaneous active electric power and the instantaneous reactive electric power of the synchronous machine based on calculation results calculated by said voltage calculation means and said current calculation means; and electrical system torque calculation means for calculating and simulating changes in the electrical system torque of the synchronous machine based on calculation results of said voltage calculation means and said current calculation means.

9. The synchronous machine simulator as claimed in claim 1, further comprising exciting voltage calculation means for calculating and simulating changes in the exciting voltage based on an exciting current of the synchronous machine.

10. A method of simulating a rotating synchronous electrical machine comprising:

connecting a rotating synchronous electrical machine as an object of simulation to a spiral converter for inputting a three phase voltage received through terminals of the synchronous machine, converting from analog to digital form real instantaneous values of the three phase voltage, and converting the real instantaneous values of the three phase voltage into spiral vectors;

performing a symmetrical component conversion for the spiral vectors to calculate a positive-sequence component voltage, a negative-sequence component voltage, and a zero-sequence component voltage, and calculating an internal voltage of the synchronous machine using the positive-sequence component voltage and a phase angle of the synchronous machine;

calculating a positive-sequence component current, a negative-sequence component current, and a zero-sequence component current using the positive-sequence component voltage, the negative-sequence component voltage, and the zero-sequence component voltage; and calculating real instantaneous values of a three phase current in the synchronous machine by performing a symmetrical component conversion for the positive-sequence component current, the negative-sequence component current, and the zero-sequence component current, wherein said synchronous machine simulator simulates a backswing characteristic, an asymmetrical three phase characteristic, instantaneous transient current, instantaneous transient voltage, instantaneous active electric power, instantaneous reactive electric power, instantaneous electrical system torque, instantaneous mechanical system torque, system shaft torque, phase angle, and exciting voltage.

11. The synchronous machine simulation method as claimed in claim 10, further comprising calculating and simulating changes in the instantaneous active electric power and the instantaneous reactive electric power of the synchronous machine based on the positive-sequence component voltage, the negative-sequence component voltage, the zero-sequence component voltage, the positive-sequence component current, the negative-sequence component current, and the zero-sequence component current.

12. The synchronous machine simulation method as claimed in claim 10, further comprising calculating and simulating changes in the electrical system torque of the synchronous machine based on the calculation results such as the positive-sequence component voltage, the negative-sequence component voltage, the zero-sequence component voltage, the positive-sequence component current, the negative-sequence component current, and the zero-sequence component current.

13. The synchronous machine simulation method as claimed in claim 12, further comprising calculating and simulating changes in the mechanical system torque of the synchronous machine using the electrical system torque and frequency of the electrical system.

14. The synchronous machine simulation method as claimed in claim 10, further comprising calculating and simulating changes in the phase angle of the synchronous machine using the electrical system torque and the mechanical system torque.

15. The synchronous machine simulation method as claimed in claim 12, further comprising calculating and simulating changes in the mechanical system torque and the shaft system torque of the synchronous machine using the electrical system torque and frequency of the electrical system.

16. The synchronous machine simulation method as claimed in claim 10, further comprising calculating and simulating changes in the instantaneous active electric power and electrical system torque of the synchronous machine based on calculation results including the positive-sequence component voltage, the negative-sequence component voltage, the zero-sequence component voltage, the positive-sequence component current, the negative-sequence component current, and the zero-sequence component current.

17. The synchronous machine simulation method as claimed in claim 10, further comprising calculating and simulating changes in the instantaneous active electric power, the instantaneous reactive electric power, and the electrical system torque of the synchronous machine based on calculation results including the positive-sequence component voltage, the negative-sequence component voltage, the zero-sequence component voltage, the positive-sequence component current, the negative-sequence component current, and the zero-sequence component current.

18. The synchronous machine simulation method as claimed in claim 10, further comprising calculating and simulating changes in the exciting voltage based on an exciting current of the synchronous machine.

* * * * *